United States Patent
Wiesner et al.

(10) Patent No.: US 6,754,234 B1
(45) Date of Patent: Jun. 22, 2004

(54) METHOD AND APPARATUS FOR ASYNCHRONOUS FRAME SYNCHRONIZATION

(75) Inventors: Christian J. Wiesner, Stouffville (CA); Collis Quinn Carter, Toronto (CA)

(73) Assignee: ATI International SRL, Barbados (KN)

(*) Notice: Subject to any disclaimer, the term of this patent is extended or adjusted under 35 U.S.C. 154(b) by 0 days.

(21) Appl. No.: 09/316,458

(22) Filed: May 21, 1999

(51) Int. Cl.$^7$ ................................................. H04J 3/06
(52) U.S. Cl. ..................... 370/503; 370/516; 375/215; 375/375
(58) Field of Search ............................... 370/503, 506, 370/510, 511, 538, 539, 501; 375/215, 240.28, 327, 375

(56) References Cited

U.S. PATENT DOCUMENTS

| | | | | |
|---|---|---|---|---|
| 5,524,107 A | * | 6/1996 | Duggan et al. | 370/17 |
| 5,963,200 A | * | 10/1999 | Deering et al. | 345/213 |
| 6,181,300 B1 | * | 1/2001 | Poon et al. | 345/1 |
| 6,195,393 B1 | * | 2/2001 | Nemioff et al. | 375/240.28 |

* cited by examiner

Primary Examiner—Alpus H. Hsu
Assistant Examiner—Thien Tran
(74) Attorney, Agent, or Firm—Vedder, Price, Kaufman & Kammholz, P.C.

(57) ABSTRACT

A method and apparatus for frame synchronization in a display circuit is achieved by first measuring a difference between a first frame period and a second frame period. When the difference exceeds a threshold, the first frame period is adjusted by replacing the clock corresponding to the first frame period with one of a slow frame rate and a fast frame rate. The slow and fast frame rates closely approximate an ideal frame rate that would synchronize the two frame periods. By switching between the slow and fast frame rates, the average frame rate approaches the ideal frame rate over time, and the two frame periods are effectively synchronized.

18 Claims, 4 Drawing Sheets

METHOD AND APPARATUS FOR ASYNCHRONOUS FRAME SYNCHRONIZATION

TECHNICAL FIELD OF THE INVENTION

The invention relates generally to frame synchronization in a display system, and more particularly to a method and apparatus for asynchronous frame synchronization in a video graphics circuit.

BACKGROUND OF THE INVENTION

Many applications involve the display of video graphics information. The source of such video graphics information may be a computer, a video cassette recorder (VCR), a digitized television signal, etc. Video graphics signals from various sources are often processed by circuitry that produces output signals suitable for a display device. Such display devices can include television sets, which operate under a number of different television display standards, and monitors such as cathode ray tube (CRT) monitors that operate under a different set of standards. As such, the signal requirements for different display devices can vary significantly.

In order to satisfy the needs of a number of different users, circuits which provide video graphics outputs for display are often required to provide more than one type of output signal. For example, a video graphics circuit may produce a television encoded signal suitable for display on a television set, and also be required to provide a CRT encoded signal suitable for display on CRT-type display devices. Because the standards specifying the encoding techniques for television and CRT-type display devices differ significantly, maintaining a uniform frame period between multiple display outputs can be troublesome.

Even when the frame rate of one display output can be chosen to approximate the frame rate of another output, the two frame rates are, in most cases, asynchronous. If no forced synchronization is induced between these asynchronous signals, one of the outputs will produce a "rolling" effect on its corresponding display. This is because the alignment of the two frame periods of the outputs will continue to diverge. For example, if the second output frame rate differs from the first output frame rate by five clock periods per frame, the end of the second output frame after the first frame period will be five clocks different then the end of the second output frame. At the end of the second frame period they will differ by ten clock periods, and at the end of the third frame period they will differ by fifteen clock periods. The "rolling" effect produced by this divergence is unacceptable.

One solution to this is forced synchronization. In forced synchronization, one of the frame periods is chosen to be the dominant, or master period. The other frame period, or the slave frame period, is synchronized to the dominant period by forcing the slave period to begin at the same time as the master period for each frame. As such, the slave frame period may be forced to reset to the beginning of the next frame either prematurely, resulting in truncation, or after the time where the next frame should have been started, resulting in an effective lengthening of the current frame. Both truncation and lengthening produce a "tearing" effect on the display that is undesirable.

Therefore, a need exists for a method and apparatus for synchronizing asynchronous display frame periods such that rolling and tearing effects are avoided.

DETAILED DESCRIPTION OF A PREFERRED EMBODIMENT OF THE INVENTION

Figure 1:
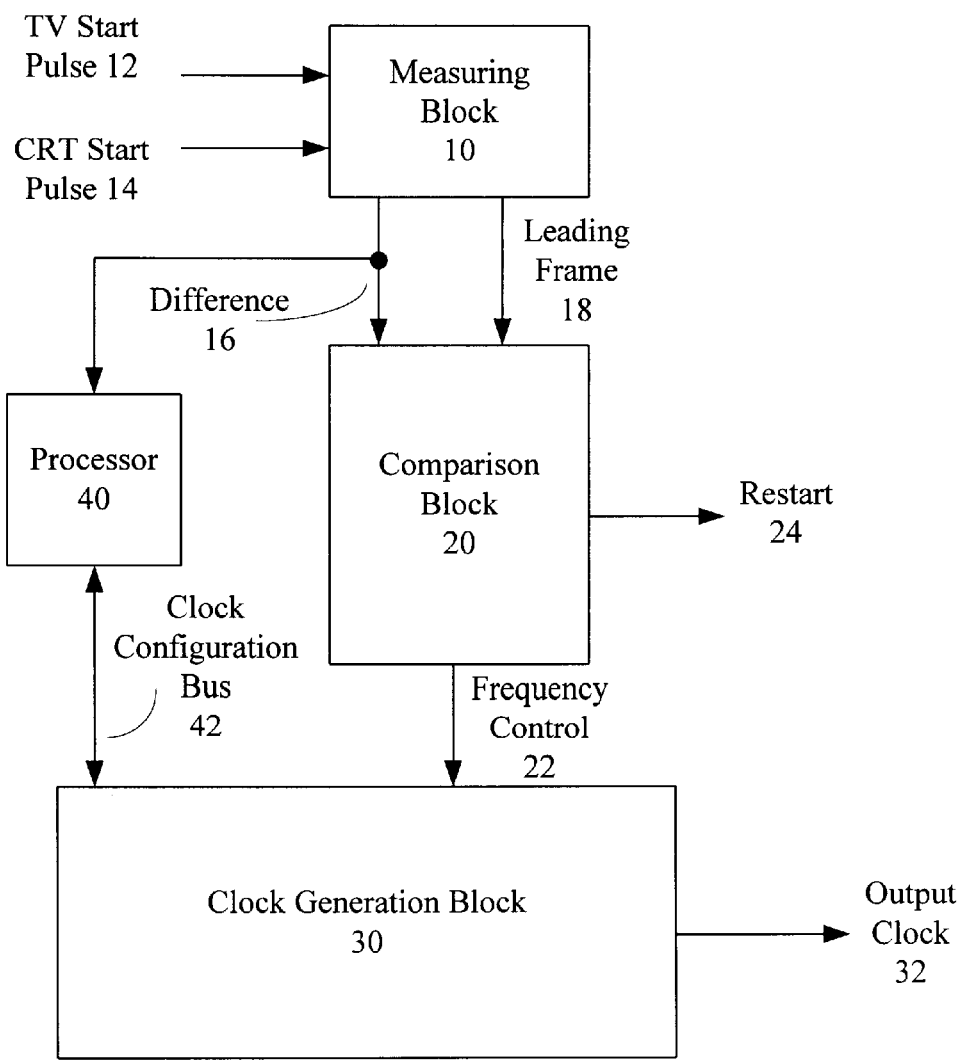
FIG. 1 illustrates a block diagram of a frame synchronization circuit in accordance with the present invention.

Generally, the present invention provides a method and apparatus for frame synchronization in a display circuit. Initially, one of the frame periods is set as closely as possible to the other frame period such that a reasonable amount of adjustment of one of the frame periods is required to synchronize the two frame periods. One of the two frame periods is then selected as the master frame period, and the frame rate of the other frame period, or slave frame period, is switched between a slow frame rate that produces a frame period slightly greater than the master frame period and a fast frame rate that produces a frame period slightly shorter than master frame period. By switching back and forth between the slow frame rate and the fast frame rate, the average frame period of the slave frame period is synchronized with the master frame period.

Switching between the slow and fast frame rates is accomplished using a measuring block that compares a first frame period corresponding to a first (slave) display signal with a second frame period corresponding to a second (master) display signal to determine which frame period is shorter and also the difference between the two frame periods. A comparison block operably coupled to the measuring block compares the difference value with a first threshold. When the difference value exceeds the larger threshold, the comparison block asserts a restart signal such that the subsequent frame of the signal corresponding to the first frame period is forced to begin at the same time as subsequent frame period for the signal corresponding to the second frame period. If the larger threshold is not exceeded by the difference, the comparison block compares the difference with a second, smaller threshold. If the difference exceeds the smaller threshold, the comparison block generates a frequency control signal based on which of the two frames is shorter.

A clock generation block is operably coupled to the comparison block, and the clock generation block generates an output clock that has an output frequency that determines the first frame period. The clock generation block sets the output frequency of the output clock at one of the slow frame rate and the fast frame rate based on the frequency control signal. The slow frame rate closely approximates an ideal frame rate that would cause the first frame period to match the second frame period, but the slow frame rate is either equal to or less than the ideal frame rate. Similarly, the fast frame rate closely approximates the ideal frame rate, but is equal to or slightly greater than the ideal frame rate. As such, the first frame period will deviate slightly from the second frame period and the differential between the start pulse corresponding to the two frame periods will gradually increase to the point where it exceeds the smaller threshold. When the second threshold has been exceeded, the frame rate corresponding to the first frame period is switched between the fast frame rate and the slow frame rate. Over time, the average frame period of the first frame period will match the frame rate of the second frame period, thus keeping the first and second frame periods synchronized.

By alternating between two frame rates that closely approximate an ideal frame rate that would synchronize the two frame periods, the system described herein allows two asynchronous frame periods to be effectively synchronized. This eliminates the rolling and tearing effects that were experienced in prior art solutions, including those solutions that forced a restart of one of the frame periods to match the start of the other frame period.

The invention can be better understood with reference to FIGS. 1–5. FIG. 1 illustrates a frame synchronization circuit that includes a measuring block 10, a comparison block 20, and a clock generation block 30. The measuring block 10 compares a first frame period and a second period to determine a leading frame that distinguishes which of the first frame period and the second frame period is shorter. In addition to this, the measuring block determines a difference value that reflects the difference between the first and second frame periods.

The measuring block 10 of FIG. 1 receives a television (TV) start pulse 12 and a CRT start pulse 14. These start pulses signal the beginning of a display frame. Preferably, the TV start pulse 12 represents the beginning of the first frame period, whereas the CRT start pulse 14 establishes the starting point of the second frame period. As such, the measuring block can compare the two start pulses 12 and 14 to determine which of the two pulses occurs first, and the difference in time between the two start pulses. As such, the measuring block determines which of the frame periods is shorter than the other frame period, which is indicated when the start pulse of one frame is received prior to the start pulse of the other. The difference in the two frame periods corresponds to the difference between receipt of the two start pulses 12 and 14. It should be noted that other techniques that should be apparent to one of ordinary skill in the art could be used to compare the two frame periods.

One of the important aspects of the present invention is selecting a frame period for one of the two frame periods to be synchronized that reasonably approximates the other frame period. One of the frame periods will be slightly adjusted in order to achieve the synchronization, and if the amount of adjustment required is too great, undesirable visual effects will result. In the case where a TV frame period and a CRT frame period are to be synchronized, the TV frame period is generally fixed by a standard, and therefore the CRT frame period must be selected to approximate the TV frame period as closely as possible. Once this has been accomplished, the slight adjustments to the TV frame period can be employed to synchronize the two frame periods.

The frame synchronization circuit of FIG. 1 is preferably included in a video graphics circuit, which is more preferably a TV encoding application specific integrated circuit (ASIC). Such video graphics circuits preferably provide display signals corresponding to different display standards, and the example illustrated in FIG. 1 corresponds to a video graphics circuit that provides a TV display signal and a CRT display signal. As such, the start pulse corresponding to each of the display signals is preferably generated within the video graphics circuit.

The comparison block 20 is operably coupled to the measuring block 10 and receives a difference signal 16 corresponding to the difference between the two frame periods, and a leading frame signal 18 which indicates which of the two frame periods is currently the shorter frame period. The comparison block 20 compares the difference value with a first, larger threshold to determine if the difference between the two frame periods is so great that a forced restart must be implemented. Typically, in a TV encoder application, a forced restart will be required when the source of the video graphics display information changes, for example, when the TV channel is changed. When the larger threshold is exceeded, the comparison block 20 asserts a restart signal 24, which forces the subsequent TV frame period to begin at the same time as the subsequent CRT frame period. Although this may result in some tearing on the initial restart sequence, such artifacts are acceptable for the rare occasions in which they occur.

If the comparison block 20 determines that the first threshold has not been exceeded, indicating that a restart is not required, the comparison block 20 compares the difference value 16 with a second, smaller threshold. The smaller threshold corresponds to a point where the difference between the two frame periods has reached the point that correction is required. In other words, the two frame periods are not so different that a forced restart is required, but they are approaching the tolerance of the system or application. This smaller threshold can be set based on the needs of the application in terms of the amount of deviation between frame periods that is acceptable. If it is determined that the smaller threshold is not exceeded, no adjustment is required of the current frame rate of the TV display signal.

If the comparison block 20 determines that the difference value 16 exceeds the smaller threshold, and that some correction is required, the comparison block 20 generates a frequency control signal 22 that indicates some alteration in the frame rate of the TV display signal is required. The frequency control signal 22 is generated based on the leading frame signal 18. The difference signal 16 indicates the magnitude by which the two frame periods differ, whereas the leading frame signal 18 determines which of the two frame periods is shorter than the other frame period. Thus, in some instances, the frequency control signal 22 will indicate that the frame rate corresponding to the first frame period must be increased in order to shorten the first frame period, whereas in other instances, the frequency control signal 22 will indicate that the frame rate corresponding to the first frame period must be decreased in order to lengthen the first frame period.

The clock generation block 30 is operably coupled to the comparison block 20 and receives the frequency control signal 22. The clock generation block 30 generates an output clock 32 that has an output frequency, where the output frequency corresponds to the frame rate that determines the first frame period. The clock generation block 30 sets the output frequency of the output clock 32 to one of a slow frame rate and a fast frame rate based on the frequency control signal. There is an ideal frame rate which would cause the first frame period to match the second frame period, but due to limitations on the clock generation block 30, this ideal frame rate cannot typically be generated. These limitations may include the frequency resolution limitations of a phase locked loop that is included in the clock generation block 30, or other limitations on the frequency generation capabilities of the clock generation block 30.

Because of these limitations, a fast frame rate and a slow frame rate that closely approximate the ideal frame rate are generated. The fast frame rate and the slow frame rate are preferably frame rates that are very close to the ideal frame rate, but within the frequency generation limitations of the clock generation block 30. The slow frame rate is a close approximation to the ideal frame rate, but is not greater than the ideal frame rate. Similarly, the fast frame rate is a close approximation that is not slower than the ideal frame rate. In some cases the fast or slow frame rate may match the ideal frame rate, and in the rare instance where an exact match occurs, the comparison block will not detect a difference value that exceeds the second threshold, and therefore adjustment will not be required.

Typically, the frame rate corresponding to the first frame period and the frame rate corresponding to the second period are generated by separate phase locked loops that are coupled and synchronized to a common crystal. As such, changes in the crystal frequency will track between the two phase locked loops. In order to closely approximate the ideal frame rate over time, the phase locked loop that generates the first frame rate can be switched between the fast and slow frame rates based on the current difference between the two frame periods.

Preferably, the frame synchronization circuit further includes a processor 40, which is used to configure the clock generation block 30. In order to do so, the processor 40 provides a clock configuration bus 42 to the clock generation block 30. This bus can be used to initialize various registers or other values stored within the clock generation block 30. The specific operation of the processor 40 with respect to the preferred embodiments described herein is discussed in more detail with respect to FIGS. 2 and 3.

Figure 2:
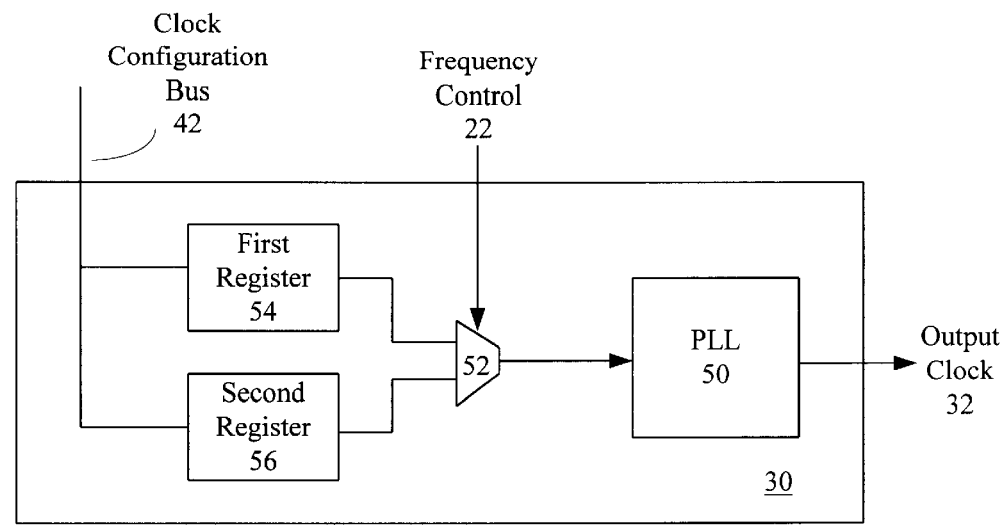
FIG. 2 illustrates a block diagram of a more detailed view of the clock generation block of FIG. 1.

FIG. 2 illustrates a more detailed view of the clock generation block 30 as implemented in one embodiment of the present invention. In this embodiment, the clock generation block 30 includes a phase locked loop (PLL) 50 and a pair of registers 54 and 56. The first register stores a first set of parameters that configure the PLL to produce the output clock 32 with an output frequency that matches the slow frame rate. Similarly, the second register stores a second set of parameters that configure the PLL to produce an output clock 32 having an output frequency that matches the fast frame rate. These parameters may represent a fraction, N/M, that is multiplied by a reference frequency of the PLL 50 to achieve the desired output frequency. The frequency control signal 22 determines which of the two parameter sets is provided to the PLL 50 such that the appropriate frame rate is generated. This may be accomplished through the use of a multiplexor 52, or some other selection means.

The clock configuration bus 42 is coupled to the first and second registers 54 and 56 to allow the parameter sets within the registers to be configured by the processor 40. Preferably, the processor 40 receives a difference value corresponding to an initialization measurement performed by the measuring block 10. Based on this initialization difference value, the processor calculates the first and second sets of parameters to be stored within the first and second registers 54 and 56. The processor determines the parameter sets such that the fast frame rate and the slow frame rate produced by the PLL 50 are such that the first frame period closely approximates the second frame period as described earlier.

An optimal, or ideal frequency would cause the first frame period to match the second frame period. However, the resolution of the frequency levels which the PLL 50 can generate is limited. As such, the slow frame rate and the fast frame rate are the best approximations to the ideal frequency that can be generated by the PLL 50. Because these frame rates do not match the ideal frequency, some deviation between the first frame period and the second frame period will occur. When the fast frame rate is used, the first frame period will become shorter and the offset of the start of the first frame period with respect to the start of the second frame period will gradually be reduced. At some point, the start of the first frame period will begin to be detected prior to the start of the second frame period. The difference will continue to be measured, and the fast frame rate utilized until the difference exceeds the shorter threshold. At that point, the frequency control signal 22 will switch the PLL to the parameter set corresponding to the slow frame rate. At this point, the first frame period will lengthen and the start of the first frame period will again approach the start of the second frame period. It will close the gap and eventually pass the start of the first frame period and continue to occur later and later with respect to the start of the second frame period until the difference between the two periods exceeds the second threshold once again. At this point, the frequency control signal 22 will switch back such that the fast frame rate is produced by the PLL 50. As such, over time the average of the first frame period will match the second frame period.

Figure 3:
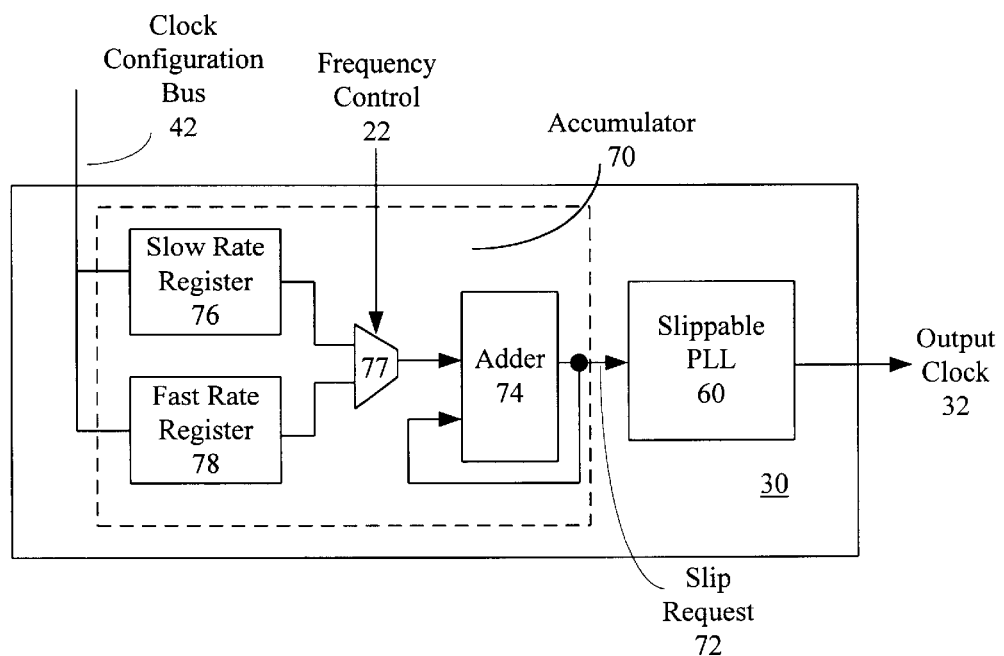
FIG. 3 illustrates a block diagram of a more detailed view of another embodiment of the clock generation block of FIG. 1.

FIG. 3 illustrates an alternate embodiment of a clock generation block 30 in accordance with the present invention. The clock generation block 30 of FIG. 3 includes a slippable PLL 60, and an accumulator 70. The slippable PLL 60 is a PLL which can insert slips into the output clock that it produces. A slip effectively extends a single period of the output clock by one-fifth of that period's normal length. Note that in other embodiments, the amount of the time added by a slip to the period of the clock may vary. The specific operation of the slippable PLL is detailed in a co-pending patent application entitled "Method and Apparatus for Controlling an Output Frequency of a Phase Locked Loop", filed on Jun. 16, 1997, having a Ser. No. 08/876,731. By including slips within the output clock stream, the slippable PLL 60 can effectively alter the average frequency of the output clock that it produces. From a base frequency, the slippable PLL can produce various average frequencies that are less than the base frequency. If more slips are included in the output clock stream, a lower frequency clock is effectively produced, whereas if fewer slips are included, the average frequency is still lower than the base frequency, but not as low as the average frequency created with more slips. The slippable PLL achieves these varying average output frequencies by injecting deterministic jitter into the clock signal produced such that certain clock periods are increased, which alters the average output frequency of the slippable PLL.

The clock generation block 30 of FIG. 3 performs the same function of the clock generation block of FIG. 2 in that it produces an output clock 32 at one of two different average output frequencies. These frequencies correspond to the slow frame rate and the fast frame rate described above. In order to achieve the two different frame rates, the slippable PLL 60 inserts a different number of slips into the output clock 32 on a frame-by-frame basis. The accumulator 70 controls when a slip is implemented in the output clock stream using the slip request signal 72. Whenever the slip request signal 72 is asserted, the slippable PLL 60 inserts a slip into the output clock stream 32. The base frequency of the slippable PLL 60 is greater than the average frequencies of the fast frame rate and the slow frame rate, such that the variable injection of slips slows the effective, or average output frequency of the slippable PLL 60 by an amount that results in one of the fast frame rate and the slow frame rate.

The accumulator stores a value that is incremented by an increment value based on the output frequency of the output clock 32. The accumulator is a fixed size, and when the accumulator rolls over as the maximum value of the accumulator is exceeded, the slip request signal is asserted. Preferably, the slip request signal is derived from the carry out signal of the accumulator 70. Thus, the slip request will be asserted each time the accumulator rolls over and a carry would be produced.

In order to control the frequency of slip requests 72, the increment value utilized by the accumulator 70 is controlled. A higher increment value will cause the accumulator to roll over more often, resulting in more slip requests. Similarly, a smaller increment value will result in the accumulator rolling over less frequently, and a result in less frequent slip requests. The accumulator 70 preferably includes an adder 74. The adder 74 adds the previous accumulated value to the increment value provided to the adder 74. The increment value is preferably selected from one of two values, where a first increment value corresponds to the number of slips required to achieve the fast frame rate, and the other increment value will cause the adder to roll over the number of times equivalent to the slips required to achieve the slow frame rate. Preferably, these increment values are stored in slow rate register 76 and fast rate register 78. Which of these two increment values is provided to the adder is controlled by the frequency control signal 22, and this selection may be achieved using a multiplexor 77 or some other selection device.

The clock configuration bus 42 is provided from the processor 40 to the slow rate register 76 and the fast rate register 78 to allow the increment value stored within these registers to be configured. Once again, the processor receives the difference value corresponding to an initialization measurement, and the processor calculates the slow and fast increment values based on the difference value corresponding to the initialization measurement to determine the appropriate increments to achieve the desired slow and fast frame rates. The calculations are preferably performed using software. The processor 40 then stores the fast increment value in the fast rate register and the slow increment value in the slow rate register. Note that the processor's determination of these increment values is going to be based on the size of the adder 74 and the base frequency of the slippable PLL 60. In other embodiments, the slippable PLL 60 may be configured by the processor 40 to implement a specific base frequency that is appropriate for the specific implementation.

Figure 4:
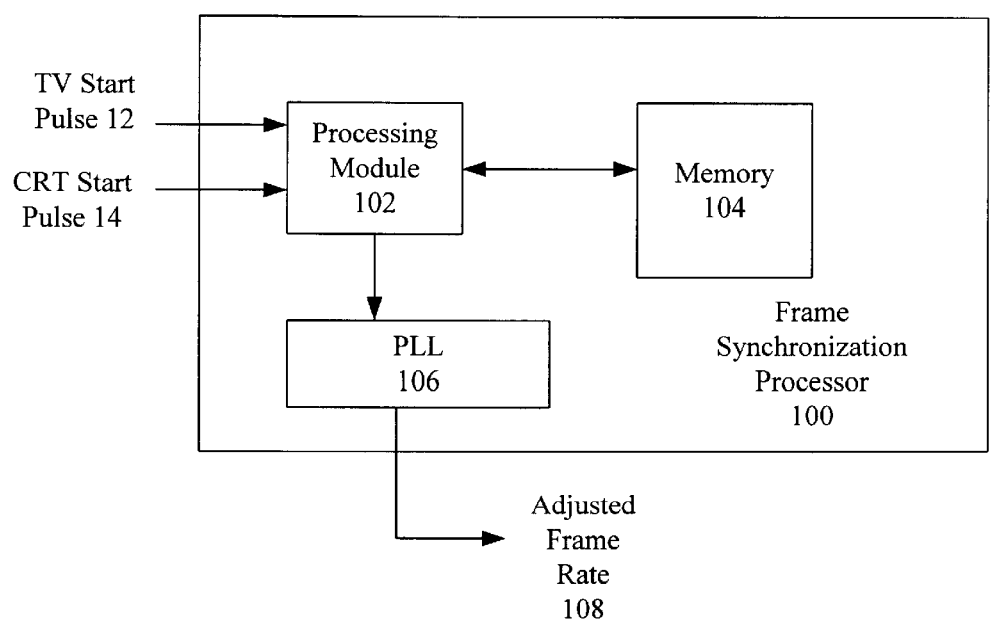
FIG. 4 illustrates a block diagram of a frame synchronization processor in accordance with the present invention.

FIG. 4 illustrates a frame synchronization processor 100 that achieves the same result as the frame synchronization circuit of FIG. 1, whereas more aspects of the circuitry are included in software rather than hardware. It should be apparent to one of ordinary skill in the art that many of the required functions of the present invention could be implemented in either software or hardware, and the selection of how each function is performed may be based on a number of different factors. The frame synchronization processor 100 includes a processing module 102, memory 104, and preferably also includes a phase locked loop 106. The processing module 102 receives the TV start pulse 12 and the CRT start pulse 14 such that a difference between these two start pulses and a determination as to the leading start pulse can be determined. Based on this determination, the processing module 102 can, through the use of software instructions stored within the memory 104, modify the frame rate produced by the PLL 106 to produce an adjusted frame rate 108 that, on average, synchronizes two frame periods associated with the received start pulses.

The processing module 102 may include a single processing entity or a plurality of processing entities. Such a processing entity may include a microprocessor, microcontroller, microcomputer, digital signal processor, central processing unit, state machine, group of logic circuitry, and/or any device that processes information based on operational and/or programming instructions. The memory 104 may be a single memory device or a plurality of memory devices. Such a memory device may be a read-only memory device, a random access memory device, floppy disk, hard drive memory, CD memory, magnetic tape memory, DVD memory, and/or any device that stores digital information. Note that when the processing module 102 has one or more of its functions performed by a state machine and/or logic circuitry, the memory containing the corresponding operational instructions is embedded within the state machine and/or logic circuitry.

Figure 5:
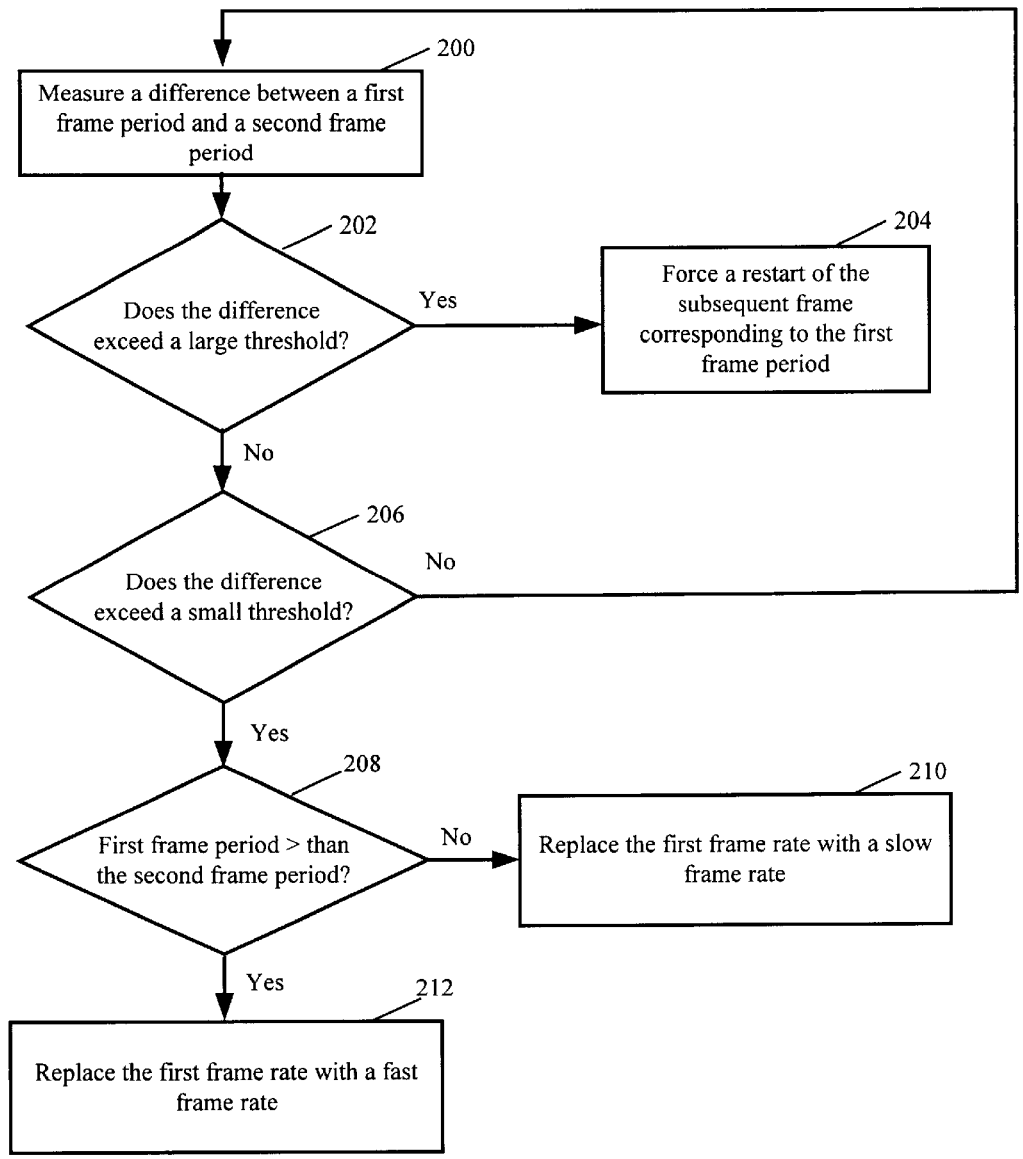
FIG. 5 illustrates a flow diagram of a method for frame synchronization in accordance with the present invention.

The memory 104 stores programming and/or operating instructions that, when executed, cause the processing module 102 to perform the method illustrated in FIG. 5. FIG. 5 illustrates a flow diagram of a method for frame synchronization. The method begins at step 200, where the difference between a first frame period and a second frame period is measured. Once again, it is important that the frame periods are initially configured such that they are approximately the same. This allows the slave frame period to be adjusted by an amount that allows it to be synchronized to the master frame period, but does not induce undesired visual artifacts. Measuring the difference between the first frame period and the second frame period preferably includes measuring the absolute value of the difference between the two frame periods, and also which of the frame periods is shorter. The first frame period corresponds to a first frame rate, and the second frame period corresponds to a second frame rate. As described earlier, the first frame period preferably corresponds to a frame period associated with a TV display signal, whereas the second frame period preferably corresponds to a CRT display signal. However, the techniques for frame synchronization described herein may be applicable in many other applications.

At step 202, it is determined whether or not the different measured at step 200 exceeds a second threshold, which is a large threshold. This large threshold corresponds to a determination as to whether the two frame periods are completely misaligned. If this is the case, and the second threshold has been exceeded, the method proceeds to step 204 where a forced restart is implemented. The forced restart causes the first frame period to begin based on the start pulse of the second frame period. This will achieve some level of alignment and synchronization between the two frame periods.

If it is determined at step 202 that the large threshold is not exceeded, the method proceeds to step 206 where the difference between the two frame periods is compared with a first threshold, which is smaller than the second threshold. The smaller threshold corresponds to the point where the two frame periods are fairly close, but the synchronization of the two periods is beginning to drift outside of an acceptable range. As such, if it is determined that the difference does not exceed this small threshold, the difference between the two frame periods is deemed acceptable, and the method proceeds back to 200 to measure the difference for the next frame period. If it is determined at step 202 the different exceeds the small threshold, and adjustment of the first frame period is required, the method proceeds to step 208.

At step 208, it is determined whether the first frame period is greater than the second frame period. If the first frame period is greater than the second frame period, then the first frame rate is too slow, and the method proceeds to step 212, where the first frame rate is replaced with a fast frame rate. Similarly, if it is determined at step 208 that the first frame period is shorter than the second frame period, the method proceeds to step 210 where the first frame rate is replaced with a slow frame rate. The fast and slow frame rates correspond to two frame rates that closely approximate an ideal frame rate that would cause the two frame periods to be synchronized. By switching between the fast and slow frame rate based on whether or not the first frame period has strayed from the second frame period by the small threshold, the average frame period of the first frame period matches the second frame period. This causes the asynchronous frame periods to be effectively synchronized.

In order to achieve the fast frame rate and the slow frame rate, two different preferred techniques are utilized. One technique matches the description corresponding to FIG. 2, such that the phase locked loop receives two different sets of parameters where each set of parameter produces one of the fast frame rate and the slow frame rate. In order to switch between the two frame rates, the parameters provided to the phase locked loop are switched back and forth accordingly.

In the second preferred technique, the method determines a number of slips to include in a loop frame period to achieve the fast frame rate and the slow frame rate. Preferably, this is accomplished by the processing module 102. In this case, the PLL 106 is a slippable PLL, as was described earlier. Once the number of slips that will achieve the fast and slow frame rates is calculated, control information is provided to the slippable phase locked loop to produce the output clock having an average output frequency that is equal to one of the fast frame rate and the slow frame rate. The number of slips injected into the output clock is determined based on how much the frame period corresponding to the output clock must be reduced by, and how much reduction is achieved by each slip. The slips are spread out over the entire frame, and the total number of slips per frame must be determined in order to configure the slippable PLL properly.

Once the appropriate number of slips to be included within each frame period to achieve both the fast frame rate and the slow frame rate have been determined, the increment value of an accumulator I set such that the accumulator will wrap around and determine the appropriate slip insertion points. The accumulator is used because it will spread the slip events throughout the frame period, thus minimizing any potential visual effects. The accumulator increments at the output frequency of the slippable phase locked loop, and with each increment, the accumulator approaches its maximum value. When the accumulator exceeds the maximum value and rolls over, the carry bit of the accumulator is provided as a slip request signal to the slippable PLL.

The increment value provided to the accumulator may be derived from two registers. A first register stores a slow increment value corresponding to the slow frame rate, and the second register stores a fast increment value corresponding to the fast frame rate. These contents of these registers are then selectively provided to the accumulator as the increment value.

In order to initialize these registers, the processing module 102 must calculate the number of slips to include in the loop frame period to achieve the slow frame rate. It then calculates the slow increment value based on the number of slips, where this calculation will be based on the size of the accumulator. Finally, the slow increment value is stored in the first register. Similarly, a second number of slips to include in the loop frame period to achieve the fast frame rate is determined. The fast increment value is then calculated based on this second number of slips and the size of the accumulator. Once the fast increment value has been determined, it is stored within the second register.

Once the system is initialized, the first frame period will effectively be synchronized with the second frame period by causing the clock corresponding to the first frame period to switch between the two frequencies that closely approximate an ideal frequency that would synchronize the two frame periods exactly. Limitations in phase locked loop technology force the flipping between two frequencies that approximate the ideal frequency rather than a phase locked loop which simply implements the ideal frequencies.

The point where the switch from one frequency to the other occurs (the smaller threshold) is determined based on a trade-off between different potential visual artifacts. Some jitter will be induced into the system when the frequency switches between the slow rate and the fast rate. A tight threshold level that determines when the frequency is switched between the slow rate and the fast rate will cause more frequent switches between the two rates and therefore induce more instances of small, tight jitter into the system. A larger threshold will cause less frequent jitter, but the jitter will be of a greater magnitude and possibly more noticeable. Therefore, the trade-off is between a large amount of small tight jitter and infrequent injections of larger jitter into the system.

It should be understood that the implementation of variations and modifications of the invention and its various aspects will be apparent to those of ordinary skill in the art, and the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A method for frame synchronization, comprising:
   measuring a difference between a first frame period and a second frame period, wherein the first frame period corresponds to a first frame rate, wherein the second frame period corresponds to a second frame rate, such that either the first frame rate or the second frame rate may be adjusted;
   determining if the difference exceeds a first threshold;
   when the difference exceeds the first threshold, adjusting the first frame rate, wherein when the first frame period is less than the second frame period, the first frame rate is replaced with a slow frame rate, wherein the slow frame rate is not greater than an ideal frame rate that would cause the first frame period to match the second frame period, wherein when the first frame period is greater than the second frame period, the first frame rate is replaced with a fast frame rate, wherein the fast frame rate is not less than the ideal frame rate; and
   wherein adjusting the first frame rate further comprises:
      determining a number of slips to include in a loop frame period to achieve at least one of the fast frame rate and the slow frame rate; and
      providing control information to a slippable phase locked loop that produces an output clock having an output frequency, wherein the slippable phase locked loop injects slips into the output clock such that the output frequency has an average frame rate over the loop frame period that is equal to one of the fast frame rate and the slow frame rate.

2. The method of claim 1, wherein replacing the first frame rate with the slow frame rate further comprises selecting a first set of parameters that are provided to a phase locked loop to produce the slow frame rate, and wherein replacing the first frame rate with the fast frame rate further comprises selecting a second set of parameters that are provided to the phase locked loop to produce the fast frame rate.

3. The method of claim 1, wherein providing control information to the slippable phase locked loop further comprises:

setting the increment value of an accumulator, wherein the accumulator increments at the output frequency of the slippable phase locked loop; and when the accumulator rolls over as a maximum value of the accumulator is exceeded, providing a slip request to the slippable phase locked loop, wherein the slip request causes the slippable phase locked loop to include a slip in the output clock.

4. The method of claim 3, wherein setting the increment value further comprises selecting one of a first register and a second register, wherein the first register stores a slow increment value corresponding to the slow frame rate, wherein the second register stores a fast increment value corresponding to the fast frame rate.

5. The method of claim 4, wherein determining the number of slips to include in the loop frame period further comprises:

calculating a first number of slips to include in the loop frame period to achieve the slow frame rate;

calculating the slow increment value based on the second number of slips;

storing the slow increment value in the first register;

calculating a second number of slips to include in the loop frame period to achieve the fast frame rate;

calculating the fast increment value based on the second number of slips; and storing the fast increment value in the second register.

6. The method of claim 1 further comprises:

prior to the step of determining if the difference exceeds the first threshold, determining if the difference exceeds a second threshold, wherein the second threshold is greater than the first threshold; and when the difference exceeds the second threshold, forcing a restart of a frame corresponding to the first frame period, wherein a forced restart establishes an initial level of synchronization between the first frame period and the second frame period.

7. A frame synchronization circuit, comprising:

a measuring block, wherein the measuring block compares a first frame period and a second frame period to determine a leading frame that distinguishes which of the first frame period and the second frame period is shorter and a difference value between the first and second frame periods;

a comparison block operably coupled to the measuring block, wherein the comparison block compares the difference value with a first threshold, wherein when the difference value exceeds the first threshold, the comparison block asserts a restart signal, wherein when the first threshold is not exceeded, the comparison block compares the difference value with a second threshold, wherein the second threshold is less than the first threshold, wherein when the second threshold is exceeded, the comparison block generates a frequency control signal based on the leading frame; and a clock generation block operably coupled to the comparison block, wherein the clock generation block generates an output clock that has a output frequency that determines the first frame period, wherein the clock generation block sets the output frequency at one of a slow frame rate and a fast frame rate based on the frequency control signal, the clock generation block further comprises a phase locked loop, a first register, and a second register, wherein the first register stores first parameters that configure the phase locked loop to produce the slow frame rate, wherein the second resister stores second parameters that configure the phase locked loop to produce the fast frame rate, wherein the frequency control signal selects parameters of one of the first and second registers to configure the phase locked loop.

8. The frame synchronization circuit of claim 7, wherein the slow frame rate is not greater than an ideal frame rate that would cause the first frame period to match the second frame period, and wherein the fast frame rate is not less than the ideal frame rate.

9. The frame synchronization circuit of claim 8, further comprises a processor operably coupled to the measuring block and the clock generation block, wherein the processor receives the difference value corresponding to an initialization measurement, wherein the processor calculates the first and second parameters based on the difference value corresponding to the initialization measurement, wherein the processor stores the first parameters in the first register, wherein the processor stores the second parameters in the second register.

10. The frame synchronization circuit of claim 8, wherein the clock generation block further comprises a slippable phase locked loop, wherein the slippable phase locked loop injects slips into the output clock to produce one of the fast frame rate and the slow frame rate, wherein the output frequency of the slippable phase locked loop without slips is greater than frequencies of the fast frame rate and the slow frame rate.

11. The frame synchronization circuit of claim 10, wherein the clock generation block further comprises an accumulator operably coupled to the comparison block and the slippable phase locked loop, wherein the accumulator increments by an increment value at the output frequency of the slippable phase locked loop, wherein the increment value is configured by the frequency control signal, wherein when the accumulator rolls over as a maximum value of the accumulator is exceeded, the accumulator asserts a slip request signal that causes the slippable phase locked loop to inject a slip into the output clock.

12. The frame synchronization circuit of claim 11, wherein the accumulator further comprises a slow rate register and a fast rate register, wherein the slow rate register stores a slow increment value, wherein the fast rate register stores a fast increment value, wherein the frequency control signal selects one of the slow increment value and the fast increment value as the increment value.

13. The frame synchronization circuit of claim 12, further comprises a processor operably coupled to the measuring block and the clock generation block, wherein the processor receives the difference value corresponding to an initialization measurement, wherein the processor calculates the slow and fast increment values based on the difference value corresponding to the initialization measurement and the output frequency of the slippable phase locked loop, wherein the processor stores the slow increment value in the slow rate register, wherein the processor stores the fast increment value in the fast rate register.

14. The frame synchronization circuit of claim 7, wherein the first frame period corresponds to a television frame period, wherein the second frame period corresponds to a cathode ray tube frame period.

15. A frame synchronization processor comprising:
   a processing module;
   memory operably coupled to the processing module, wherein the memory includes operating instruction that cause the processing module to:
      measure a difference between a first frame period and a second frame period, wherein the first frame period corresponds to a first frame rate, wherein the second frame period corresponds to a second frame rate;
      determine if the difference exceeds a first threshold;
      when the difference exceeds the first threshold, adjust the first frame rate, wherein when the first frame period is less than the second frame period, the first frame rate is replaced with a slow frame rate, wherein the slow frame rate is not greater than an ideal frame rate that would cause the first frame period to match the second frame period, wherein when the first frame period is greater than the second frame period, the first frame rate is replaced with a fast frame rate, wherein the fast frame rate is not less than the ideal frame rate; and
   a slippable phase locked loop, the memory further includes operating instructions that cause the processing module to:
      determine a number of slips to include in a loop frame period to achieve at least one of the fast frame rate and the slow frame rate; and
      provide control information to the slippable phase locked loop that produces an output clock having an output frequency, wherein the slippable phase locked loop infects slips into the output clock such that the output frequency has an average frame rate over the loop frame period that is equal to one of the fast frame rate and the slow frame rate.

16. The frame synchronization processor of claim 15 further comprises a phase locked loop, and the memory further includes operating instructions that cause the processing module to:
   replace the first frame rate with the slow frame rate by selecting a first set of parameters that are provided to the phase locked loop to produce the slow frame rate; and
   replace the first frame rate with the fast frame rate by selecting a second set of parameters that are provided to the phase locked loop to produce the fast frame rate.

17. The frame synchronization processor of claim 15, wherein the memory further includes operating instructions that cause the processing module to provide the control information to the slippable phase locked loop as slip requests, wherein the slip requests are spaced throughout the loop frame period.

18. The frame synchronization processor of claim 15, wherein the memory further includes operating instructions that cause the processing module to:
   prior to determining if the difference exceeds the first threshold, determine if the difference exceeds a second threshold, wherein the second threshold is greater than the first threshold; and
   when the difference exceeds the second threshold, force a restart of a frame corresponding to the first frame period, wherein a forced restart establishes an initial level of synchronization between the first frame period and the second frame period.

* * * * *